(12) United States Patent
Xing et al.

(10) Patent No.: US 12,477,960 B2
(45) Date of Patent: Nov. 18, 2025

(54) MEMRISTOR, METHOD OF CALCULATING HAMMING DISTANCE, AND IN-MEMORY COMPUTING INTEGRATION APPLICATION

(71) Applicant: Institute of Microelectronics, Chinese Academy of Sciences, Beijing (CN)

(72) Inventors: Guozhong Xing, Beijing (CN); Huai Lin, Beijing (CN); Zuheng Wu, Beijing (CN); Jiebin Niu, Beijing (CN); Zhihong Yao, Beijing (CN); Dashan Shang, Beijing (CN); Ling Li, Beijing (CN); Ming Liu, Beijing (CN)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 143 days.

(21) Appl. No.: 18/287,462

(22) PCT Filed: Apr. 27, 2021

(86) PCT No.: PCT/CN2021/090077
§ 371 (c)(1),
(2) Date: Oct. 18, 2023

(87) PCT Pub. No.: WO2022/226751
PCT Pub. Date: Nov. 3, 2022

(65) Prior Publication Data
US 2024/0224820 A1 Jul. 4, 2024

(51) Int. Cl.
*H10N 70/20* (2023.01)
*G11C 13/00* (2006.01)
(Continued)

(52) U.S. Cl.
CPC ......... *H10N 70/20* (2023.02); *G11C 13/0026* (2013.01); *G11C 13/004* (2013.01);
(Continued)

(58) Field of Classification Search
CPC ................. H10N 70/20; H10N 70/841; G11C 13/0026; G11C 13/004; G11C 13/0069;
(Continued)

(56) References Cited

U.S. PATENT DOCUMENTS 10,103,895 B1 * 10/2018 Tseng .................... H04L 9/3278
2007/0176801 A1 8/2007 Robinett et al.
(Continued)

FOREIGN PATENT DOCUMENTS

| CN | 102005536 A | 4/2011 |
|---|---|---|
| CN | 102104110 A | 6/2011 |

(Continued)

OTHER PUBLICATIONS

Chen, Ying-Chen, et al. "Dynamic conductance characteristics in HfO x-based resistive random access memory." RSC advances 7.21 (2017): 12984-12989.
(Continued)

*Primary Examiner* — Jerome Leboeuf
(74) *Attorney, Agent, or Firm* — Davis Wright Tremaine LLP; Heather M. Colburn

(57) ABSTRACT

The present disclosure provides a memristor, including a transistor and a resistive random access memory, where a drain electrode of the transistor is connected to a bottom electrode of the resistive random access memory; and the resistive random access memory includes: the bottom electrode, a resistive random access material layer, a current compliance layer and a top electrode from bottom to top, where the current compliance layer is configured to stabilize a fluctuation of a low resistance by reducing a surge current and optimizing a heat distribution, so as to improve a calculation accuracy of a Hamming distance.

8 Claims, 10 Drawing Sheets

(51) Int. Cl.
*H10B 63/00* (2023.01)
*H10N 70/00* (2023.01)

(52) U.S. Cl.
CPC ......... *G11C 13/0069* (2013.01); *H10B 63/30* (2023.02); *H10N 70/841* (2023.02); *G11C 2213/79* (2013.01)

(58) Field of Classification Search
CPC ............ G11C 2213/79; G11C 13/0007; G11C 13/00; H10B 63/30
See application file for complete search history.

(56) References Cited

U.S. PATENT DOCUMENTS

| | | | |
|---|---|---|---|
| 2012/0176831 A1 | 7/2012 | Xiao et al. | |
| 2012/0305882 A1 | 12/2012 | Gu | |
| 2016/0093802 A1 | 3/2016 | Hou et al. | |
| 2016/0225824 A1 | 8/2016 | Jo et al. | |
| 2017/0346800 A1 | 11/2017 | Katoh | |
| 2019/0371399 A1* | 12/2019 | Haukness | G11C 13/003 |
| 2020/0161373 A1* | 5/2020 | Cheng | H10B 63/20 |
| 2020/0350012 A1* | 11/2020 | Yoshimoto | G11C 13/004 |
| 2022/0006008 A1* | 1/2022 | Zhang | H10N 70/8833 |

FOREIGN PATENT DOCUMENTS

| | | | | |
|---|---|---|---|---|
| CN | 109994139 A | | 7/2019 | |
| CN | 111968689 A | | 11/2020 | |
| WO | WO-2016122525 A1 | * | 8/2016 | ......... G11C 13/0007 |

OTHER PUBLICATIONS

Chen, Shih-Wei, and Jenn-Ming Wu. "Unipolar resistive switching behavior of BiFeO3 thin films prepared by chemical solution deposition." Thin Solid Films 519.1 (2010): 499-504.

Gao, Shuang, et al. "Improving unipolar resistive switching uniformity with cone-shaped conducting filaments and its logic-in-memory application." ACS applied materials & interfaces 10.7 (2018): 6453-6462.

Gupta, Varshita, et al. "Resistive random access memory: a review of device challenges." IETE Technical Review 37.4 (2020): 377-390.

Hosoi, Y., et al. "High speed unipolar switching resistance RAM (RRAM) technology." 2006 International Electron Devices Meeting. IEEE, 2006.

Khurana, Geetika, et al. "Non-polar and complementary resistive switching characteristics in graphene oxide devices with gold nanoparticles: Diverse approach for device fabrication." Scientific Reports 9.1 (2019): 15103.

Reuben, John. "Binary addition in resistance switching memory array by sensing majority." Micromachines 11.5 (2020): 496.

Shen, Zongjie, et al. "Advances of RRAM devices: Resistive switching mechanisms, materials and bionic synaptic application." Nanomaterials 10.8 (2020): 1437.

Sun, Xinhao, et al. "A memristor-based in-memory computing network for Hamming code error correction." IEEE Electron Device Letters 40.7 (2019): 1080-1083.

Wu, Yi, et al. "Low-power TiN/Al2O3/Pt resistive switching device with sub-20 µA switching current and gradual resistance modulation." Journal of Applied Physics 110.9 (2011).

Zahoor, Furqan, Tun Zainal Azni Zulkifli, and Farooq Ahmad Khanday. "Resistive random access memory (RRAM): an overview of materials, switching mechanism, performance, multilevel cell (MLC) storage, modeling, and applications." Nanoscale research letters 15 (2020): 1-26.

Zhao, Hongbin, et al. "Highly transparent dysprosium oxide-based RRAM with multilayer graphene electrode for low-power nonvolatile memory application." IEEE Transactions on Electron Devices 61.5 (2014): 1388-1393.

Zhi, Y. S., et al. "Reversible transition between bipolar and unipolar resistive switching in Cu2O/Ga2O3 binary oxide stacked layer." AIP Advances 6.1 (2016).

International Search Report mailed Feb. 8, 2022, issued in International Patent Application No. PCT/CN2021/090077, filed Apr. 27, 2021, 2 pages.

* cited by examiner

MEMRISTOR, METHOD OF CALCULATING HAMMING DISTANCE, AND IN-MEMORY COMPUTING INTEGRATION APPLICATION

CROSS-REFERENCE TO RELATED APPLICATION

This application is a Section 371 National Stage Application of International Application No. PCT/CN2021/090077, filed on Apr. 27, 2021, entitled "MEMRISTOR, HAMMING DISTANCE CALCULATION METHOD, AND INTEGRATED STORAGE AND COMPUTATION APPLICATION," the content of which is hereby incorporated by reference in its entirety.

TECHNICAL FIELD

The present disclosure relates to a field of a memory technology, and in particular, to a memristor, a method of calculating a Hamming distance, and an in-memory computing integration application.

BACKGROUND

Hamming weight is defined as the number of non-zero characters in a binary character string, and Hamming distance is defined as the number of different characters in a corresponding position between two binary character strings with a same length, which is widely used in fields of an image recognition, an information coding and an information security encryption. However, in an information age when a demand for data processing is increasing and a processing speed is increasing, a traditional "von Neumann" architecture computing system is increasingly facing a "memory wall" problem caused by a speed gap between a memory and a processor, which may limit a further improvement of a data processing speed and bandwidth. An in-memory computing architecture designed based on a non-volatile memory is beneficial to break through a limitation of the memory wall and improve an information processing ability.

At present, a resistive random access memory has a broad prospect in applications of a new-type memory, an in-memory computing, etc. because of characteristics of a high speed, non-volatility, a simple device structure, miniaturization, a three-dimensional integration potential, a low power consumption, etc. With an increasing demand for edge computing, a resistive random access memristor with a small size, a high speed and a low power consumption has a greater potential than a traditional static random access memory and a flash memory. However, in the past research, speed and power consumption performances of a memristor based on the resistive random access memory still need to be greatly improved, and a combination with a practical application needs to be further improved.

The related art discloses an apparatus for calculating the Hamming distance, which may include a plurality of unipolar memristors, a row input and a column input. A first character string and a second character string are used as the row input and the column input, respectively. A calculation of the Hamming distance may be implemented by using different voltages, and a Hamming distance value may be read through a current accumulation.

The technical solution in the related art has the following disadvantages:
(1) The unipolar memristor used in the present disclosure has problems of a poor durability (to erasures of 103 times) and a slow operation speed (>100 ns).
(2) For the calculated character string I and the calculated character string II, amplitudes of applied voltages in rows and columns are different during the input, which may increase a complexity of a peripheral circuit design and a performance requirement of a switching device.
(3) Only a cell located in a diagonal of an array is calculated in the solution, and devices in other positions of the array are in an uninitialized activated state and may not be used, which may reduce a flexibility and an utilization rate of the array.

SUMMARY

In view of the above-mentioned technical problems, the present disclosure provides a memristor, a method of calculating a Hamming distance and an integrated application of an in-memory computing integration application, in order to partially solve at least one of the above-mentioned technical problems.

In order to achieve the above-mentioned object, an aspect of the present disclosure provides a memristor, including a transistor and a resistive random access memory, where a drain electrode of the transistor is connected to a bottom electrode of the resistive random access memory; and the resistive random access memory includes: the bottom electrode, a resistive random access material layer, a current compliance layer and a top electrode from bottom to top, where the current compliance layer is configured to stabilize a fluctuation of a low resistance by reducing a surge current and optimizing a heat distribution, so as to improve a calculation accuracy of a Hamming distance.

Each of the top electrode and the bottom electrode is made of one or any alloy of TiN, Ti, Pt, Ag, Au, Pd, Ru and W, and the resistive random access material layer is made of one of $HfO_x$, $TaO_x$, $TiO_x$, $ZrO_2$, $Al_2O_3$, NiO, ZnO and $Ta_2O_5$; and the current compliance layer is made of one of $SiO_x$, $Al_2O_3$, $TiO_x$, $TaO_x$ and $Ta_2O_5$.

The memristor further includes:
a word line, a bit line and a source line; where the word line is connected to a gate electrode of the transistor to control a turn-on and a turn-off of the transistor, and the bit line and the source line are respectively connected to the top electrode of the resistive random access memory and the source electrode of the transistor, so as to control a writing, an operation and a reading of a memory cell.

The transistor is turned on, a current pulse is injected from the bottom electrode in response to the bit line being grounded and a source voltage being greater than a threshold voltage of an erase current, so as to implement a switching of the resistive random access memory from a low resistance to a high resistance; otherwise, a current pulse is injected from the top electrode in response to the source line being grounded and the bit line voltage meeting a threshold voltage of a programming current, so as to implement a switching of the resistive random access memory from a high resistance to a low resistance.

The transistor is turned on by applying a gate voltage and an initialization forming voltage is applied to the top electrode, so as to set the resistive random access memory in a programmable/erasable state.

Another aspect of the present disclosure provides a method of calculating a Hamming distance using the above-mentioned memristor, including:

initializing the memristor into a high resistance state by an erase operation;

encoding a first binary character string into a word line and encoding a second binary character string into a source line; and encoding the first binary character string into the source line and encoding the second binary character string into the word line.

In the step of encoding a first binary character string into a word line and encoding a second binary character string into a source line, an information "0" represents grounding, and an information "1" represents a high-level pulse; the transistor is turned on, and the bit line is at a high voltage level, and only a signal of the first binary character string=1 and the second binary character string=0 is configured to change a resistance state of the resistive random access memory, so as to implement a "not implication" Boolean logic operation on a corresponding bit between the first binary character string and the second binary character string that have a same length.

In the step of encoding the first binary character string into the source line and encoding the second binary character string into the word line, an information "0" represents grounding, and an information "1" represents a high-level pulse; the transistor is turned on, and the bit line is at a high voltage level, and only a signal of the first binary character string=0 and the second binary character string=1 is configured to change a resistance state of the resistive random access memory, so as to implement a "not implication" Boolean logic operation on a corresponding bit between the second binary character string and the first binary character string that have a same length, so that an operation of a Hamming distance between the first binary character string and the second binary character string is implemented.

The memristor is a memory array, and a Hamming distance calculating operation is performed on N-bit character string by using a memory cell of a column in the memory array; where a size of N depends on a switching ratio of a device and a fluctuation of a resistance value of the device.

Yet another aspect of the present disclosure provides an in-memory computing integration application based on the above-mentioned method of calculating a Hamming distance, further including turning on a transistor to read, and including that:

a read voltage of 0.2V is provided between a source line and a read bit line during reading, and the read bit line controls the transistor to be turned on so as to generate a read current; and the Hamming distance is read from a total current according to Kirchhoff's law.

DETAILED DESCRIPTION OF EMBODIMENTS

The present disclosure provides an RRAM cell which may implement a stable writing and erasing under a control of a bipolar pulse voltage, and an application of an integrated device array of the RRAM cell.

The present disclosure provides a high-speed and ultra-low-energy in-memory computing memristor structure, and a device architecture has an application of implementing an XOR operation and a Hamming distance calculation of an integrated array of the device architecture.

A basic cell of the device is composed of a transistor and an RRAM (1T1R). Compared with a traditional three-layer RRAM structure, the present disclosure inserts a $TaO_x$ between a top electrode and $HfO_x$, so as to improve a stability of the device and increase a reliability of the Hamming distance calculation. At the same time, an in-memory computing operation of a Hamming weight and a Hamming distance of two binary character strings with a same length may be implemented using an RRAM array through a design of read-write and logic operation circuits.

Firstly, a $TaO_x$ layer provides an excellent resistance uniformity for high and low resistance states. This is because the $TaO_x$ layer, as a current compliance layer, helps the transistor to reduce a surge current caused by a high speed pulse switching during forming and programming operations, which may make the device have characteristics of a high speed and a low power consumption while increasing the stability of the device.

Secondly, a 1T1R structure and a read-write circuit are constructed by using a resistive random access memory, so as to implement a parallel read-write of a controllable device in the array. A binary information of a character string I (A) and a character string II (B) are applied by voltage signals of a word line and a source line, respectively. In a next operation, application positions of signals of the character string I (A) and the character string II (B) are interchanged, so that the Hamming distance between the two character strings may be calculated, and simultaneously a storage result may be stored in the RRAM.

Finally, a read voltage is applied across an operated memory cell to generate a total read current, and a specific value of the Hamming distance is read through a peripheral circuit.

In order to make objectives, technical solutions and advantages of the present disclosure clearer, the present disclosure will be further described in detail below with reference to specific embodiments and accompanying drawings.

Figure 1:
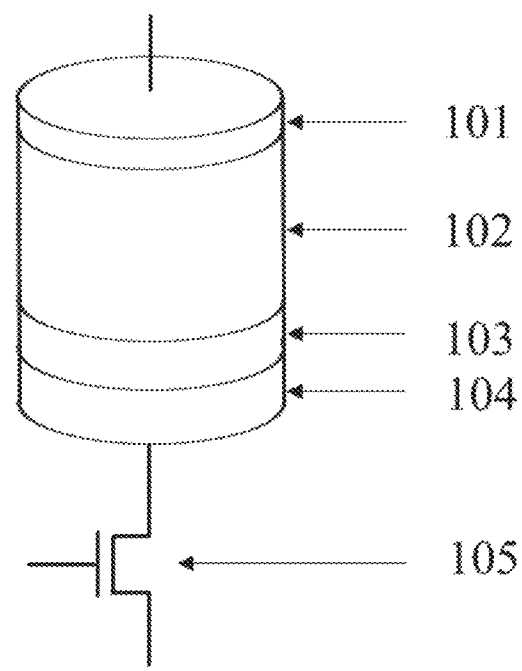
FIG. 1 is a schematic structural diagram of 1T1R (one-transistor-one-RRAM) based on RRAM provided by embodiments of the present disclosure.

As shown in FIG. 1, it is a schematic structural diagram of 1T1R based on RRAM. The memristor is composed of RRAM and a transistor 105. A basic structure of the RRAM includes a top electrode 101, a current compliance layer 102, a resistive random access material layer 103 and a bottom electrode 104. The top electrode and the bottom electrode are made of one of metals or alloys such as TIN, Ti, Pt, Ag, Au, Pd, Ru, W, etc., and the resistive random access material layer is made of $HfO_x$, $TaO_x$, $TiO_x$, $ZrO_2$, $Al_2O_3$, NiO, ZnO and $Ta_2O_5$. The current compliance layer is made of one of $SiO_x$, $Al_2O_3$, $TiO_x$, $TaO_x$ and $Ta_2O_5$, and a function of the current compliance layer is to stabilize a state after set, reduce a fluctuation of a low resistance state, and increase a reliability of a calculation result of the Hamming distance. In an array structure, the word line is connected to a gate electrode of the transistor to control a turn-on and a turn-off of the transistor, and the bit line and the source line are respectively connected to the top electrode of the resistive random access memory and the source electrode of the transistor, so as to control a writing, an operation and a reading of a memory cell.

In response to the transistor being turned on, the bit line being grounded and a source voltage being greater than a threshold voltage of an erasing current, a current pulse is injected from the bottom electrode to implement a switching of the resistive random access memory from the low resistance to a high resistance; otherwise, in response to the source line being grounded and the bit line voltage meeting a threshold voltage of a programming current, the current pulse is injected from the top electrode to implement a switching of the resistive random access memory from the high resistance to the low resistance.

For a manufactured device, a gate voltage is required to be applied to turn on the transistor, and a forming voltage (3 V to 4 V) is applied to the top electrode, so as to set the resistive random access memory in a programmable/erasable state.

Figure 2:
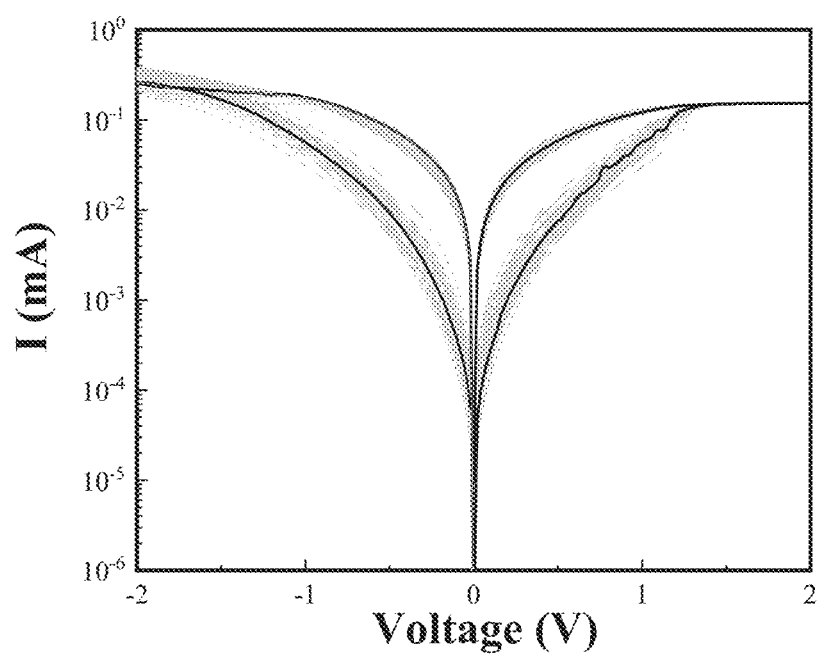
FIG. 2 is a direct current scanning I-V characteristic of a 1T1R structure provided by embodiments of the present disclosure.

As shown in FIG. 2, it is a direct current scanning I-V characteristic of a 1T1R structure. The device has a characteristic of bipolar switching. When the word line is at a high voltage level, the transistor is turned on. At this time, if V>0, the top electrode is at the high voltage level and the source line is grounded, and then a conductive filament is generated in the resistive random access material layer. At this time, the RRAM is in a low resistance state, which may be represented by a binary information "1." If V<0, the top electrode is grounded, and the source line is at the high voltage level, and then the conductive filament in the resistive random access material layer is broken. At this time, the RRAM is in a high resistance state, which may be represented by a binary information "0."

In a reading process, the word line is at the high voltage level, and the transistor is turned on. At this time, a read voltage difference of 0.2 V is applied to the top electrode. According to Kirchhoff's law, resistance states stored in the RRAM are different, and different current values are generated according to the high and low resistance states.

Figure 3A:
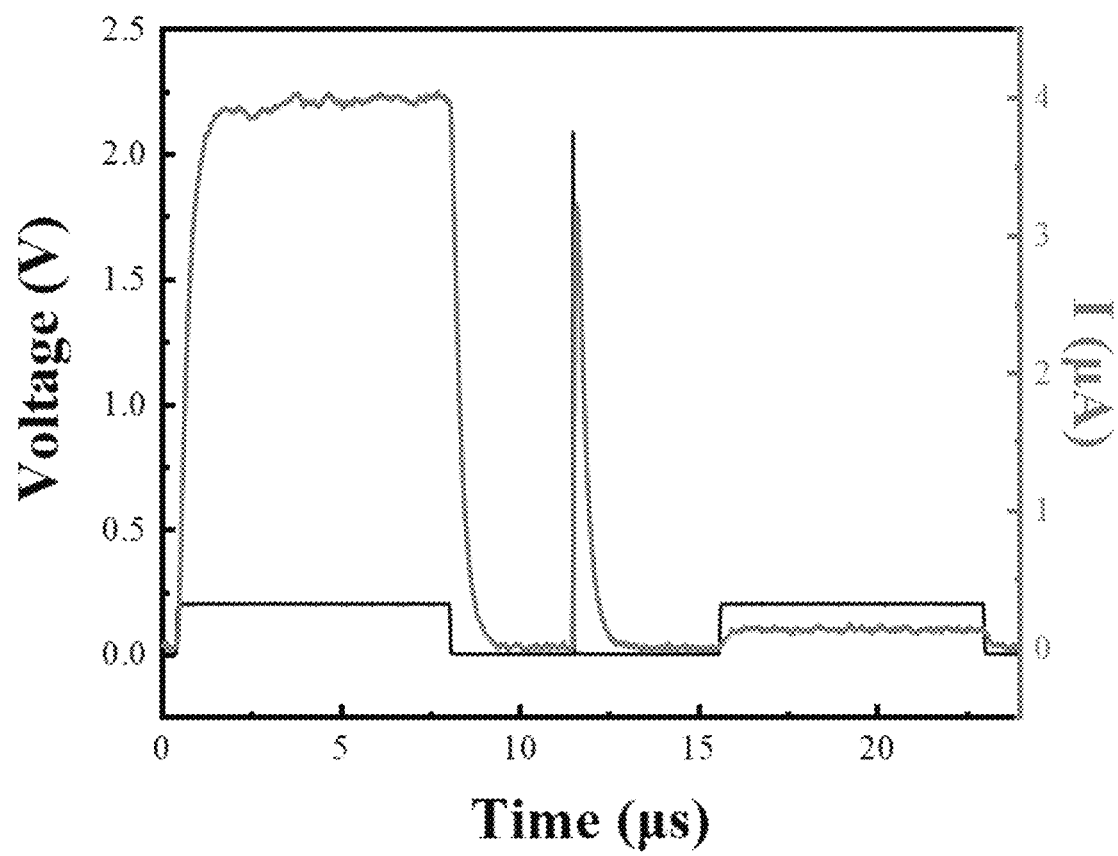
FIGS. 3A and 3B are results of a pulse erase/write operation of a 1T1R structure provided by embodiments of the present disclosure.
Figure 3B:
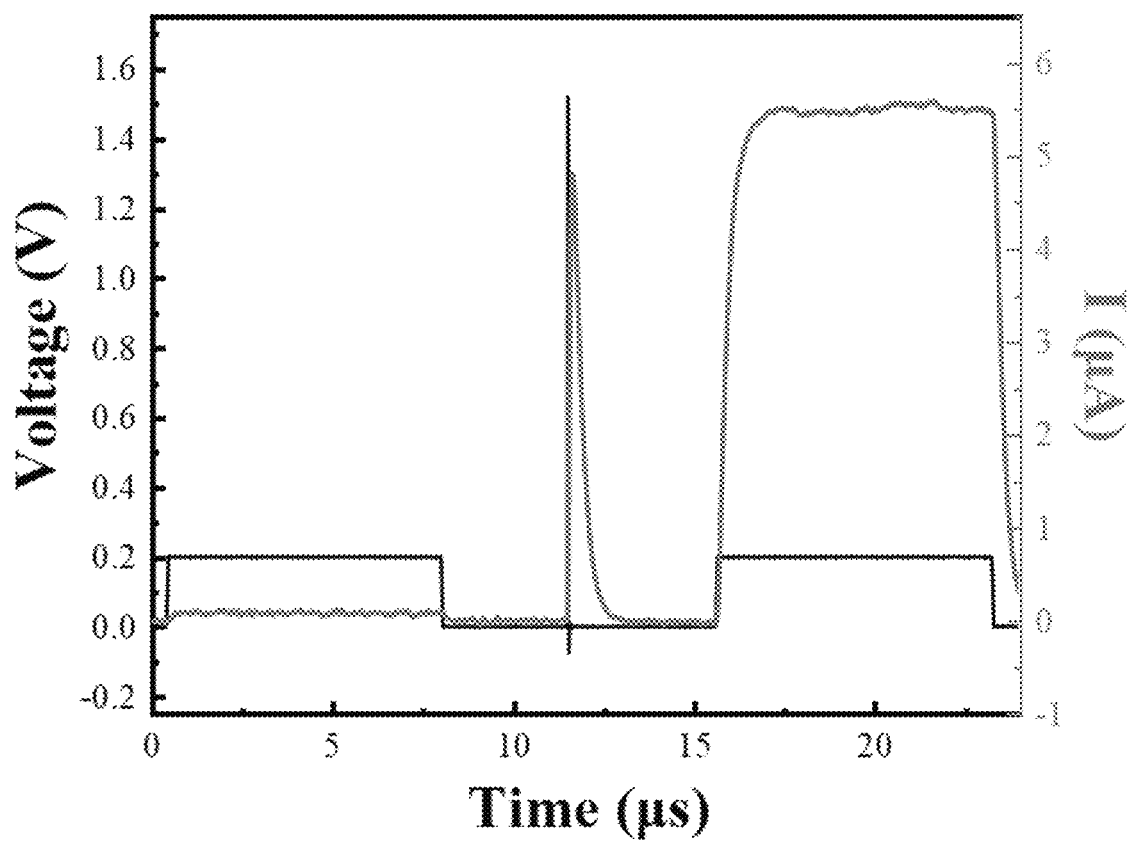

As shown in FIGS. 3A and 3B, it is a result of a pulse erase/write operation of a 1T1R structure. In a practical application, a resistance state of the RRAM may be changed by a pulse programming/erasing method. In the erase operation shown in FIG. 3A, at 12 µs, a voltage pulse of 20 ns is applied to the source electrode. A read voltage of 0.2 V is applied before and after the pulse is applied, so as to read a resistance state of the device. It can be seen from the result that a measured read current is about 4 µA before the pulse is applied, while a read current is about 0.2 µA after the current is applied, which may prove that the erase operation with the voltage pulse of 20 ns switches the resistance state of the device from the low resistance state to the high resistance state. In the programming operation shown in FIG. 3B, at 12 µs, the voltage pulse of 20 ns is applied to the top electrode. Similarly, the read voltage of 0.2 V is applied before and after the pulse is applied, so as to read the resistance state of the device. It can be seen from the result that the measured read current is about 0.2 µA before the pulse is applied, while the read current is about 5.5 µA after the current is applied, which may prove that the programming operation with the voltage pulse of 20 ns switches the resistance state of the device from the high resistance state to the low resistance state. The above-mentioned parameters are different according to conditions such as a material system, a physical size, etc., and will not be specifically limited.

Figure 4:
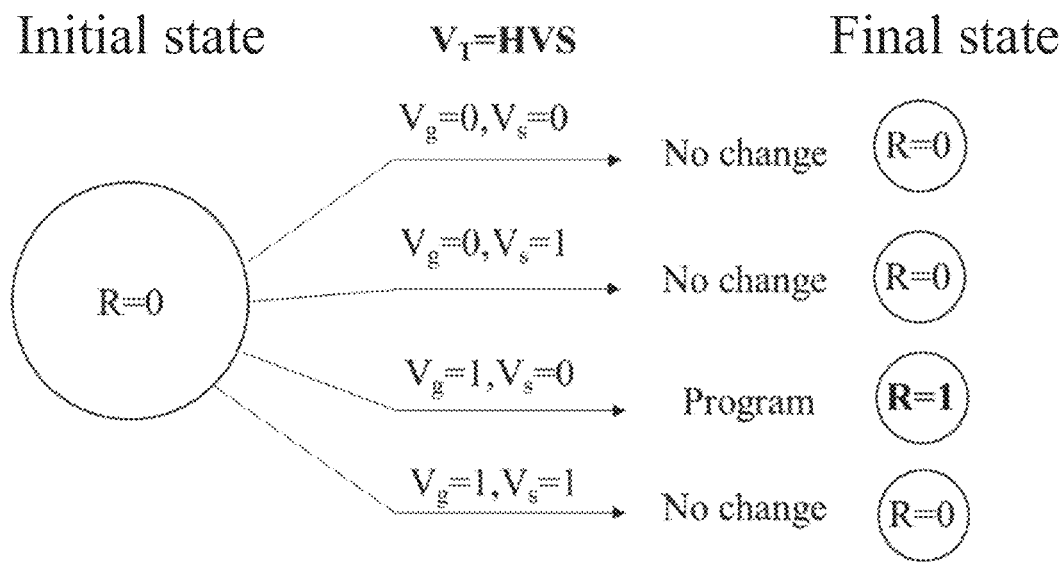
FIG. 4 is a schematic diagram of an NIMP logic operation based on a 1T1R structure provided by embodiments of the present disclosure.

As shown in FIG. 4, it is a schematic diagram of implementing an "NIMP" Boolean logic operation between a source voltage signal and a gate voltage signal. Based on the operation in FIGS. 3A and 3B, different Boolean logic operations may be constructed by applying voltages to different ports of a 1T1R device, which may become a basis for implementing the Hamming distance calculation and other in-memory computing functions. In the operation method of the present disclosure, we use an "NIMP" logic to calculate the Hamming distance between two binary character strings A and B.

When using the "NIMP" logic, firstly, the RRAM is required to be initialized to the high resistance state by using the erase operation mode in FIG. 3A, which represents the binary information "0." During the logic operation, the bit line connected to the top electrode is built in a high voltage level state (HVS) during an operation cycle, and a source line voltage Vs and a gate voltage Vg are used as input values to be calculated. The low voltage level represents "0" and the high voltage level represents "1." When Vg=Vs=0, or Vg=0 and Vs=1, the transistor is turned off, and at the same time, the resistance state of the RRAM keeps an initial high resistance state unchanged; when Vg=1 and Vs=0, the transistor is turned on, and a voltage drop is provided between the bit line and the source line, that is, the programming operation is performed, and a resistance changes from the initial high resistance state to the low resistance state, which represents the binary information "1." When Vg=Vs=1, although the transistor is turned on, no voltage difference is provided between the bit line and the source line. Therefore, the RRAM still remains in the initial high resistance state, so as to implement an operation of binary information "Vg NIMP Vs."

The present disclosure further provides a method of calculating a Hamming distance using the above-mentioned memristor, including:
initializing the memristor into a high resistance state by an erase operation;
encoding a first binary character string (A) into a word line and encoding a second binary character string (B) into a source line; and
encoding the first binary character string (A) into the source line and encoding the second binary character string (B) into the word line.

Figure 5A:
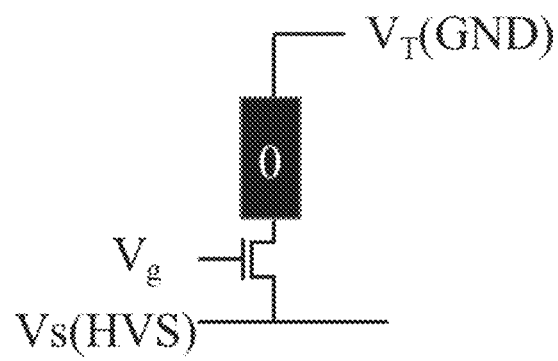
FIGS. 5A and 5B are steps of calculating a 1-bit Hamming distance provided by embodiments of the present disclosure.
Figure 5B:
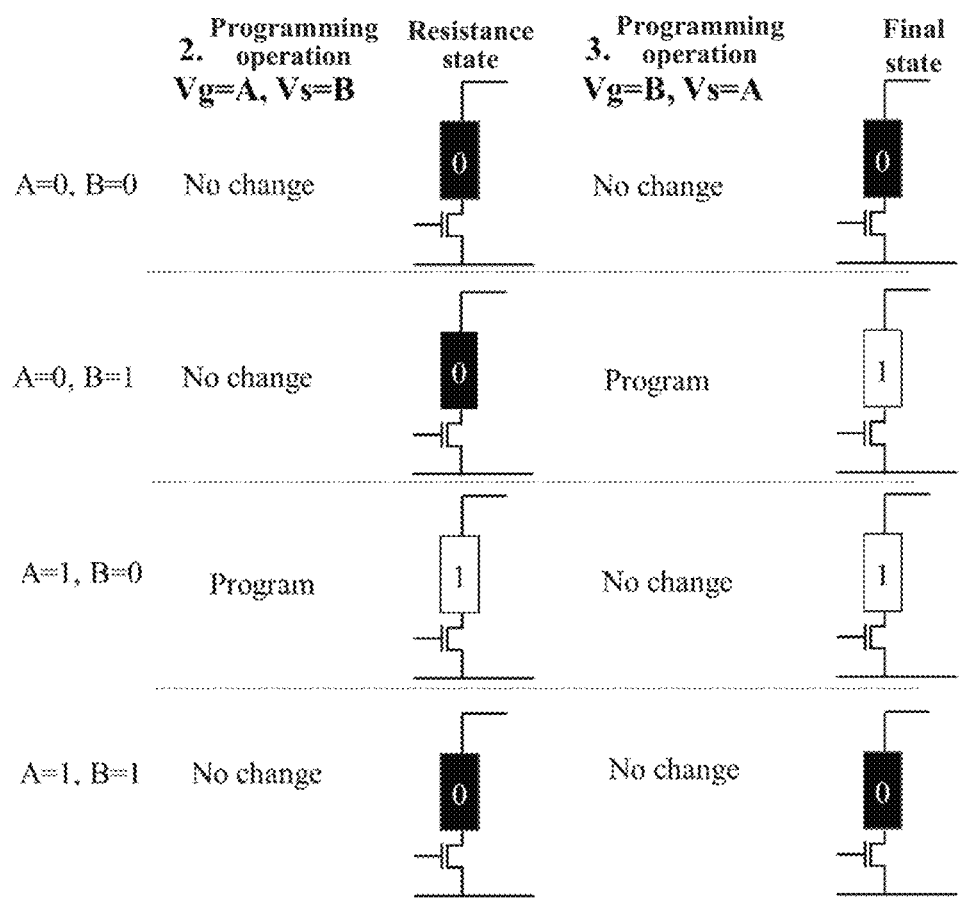

As shown in FIGS. 5A and 5B, in order to implement a solution of calculating a Hamming distance between 1-bit binary numbers A and B. Firstly, the device is initialized to the high resistance state by the erase operation, as shown in FIG. 5A, an operation mode of which is the same as the above-mentioned initialization step. Secondly, as shown in FIG. 5B, A is encoded into the word line as Vg, and B is encoded into the source line as Vs, and an operation of "A NIMP B" is completed by using the steps in FIG. 4. Then, B is encoded into the word line as Vg, and A is encoded into the source line as Vs, so as to implement an operation of "B NIMP A." An operation of "A XOR B" may be comprehensively implemented. The calculation result of the Hamming distance is stored in the RRAM, that is, when the character A is different from the character B, the device is programmed to the low resistance state, and the Hamming distance is 1; otherwise, when the character A is the same as the character B, the device remains in the initial high resistance state, and the Hamming distance is 0.

The present disclosure further provides an in-memory computing integration application based on the above-mentioned method of calculating a Hamming distance, compared with the method of calculating a Hamming distance, further includes turning on a transistor to read, and includes that:
- a read voltage of 0.2V is provided between a source line and a read bit line during reading, and the read bit line controls the transistor to be turned on so as to generate a read current; and the hamming distance is read from a total current according to Kirchhoff's law.

Figure 6:
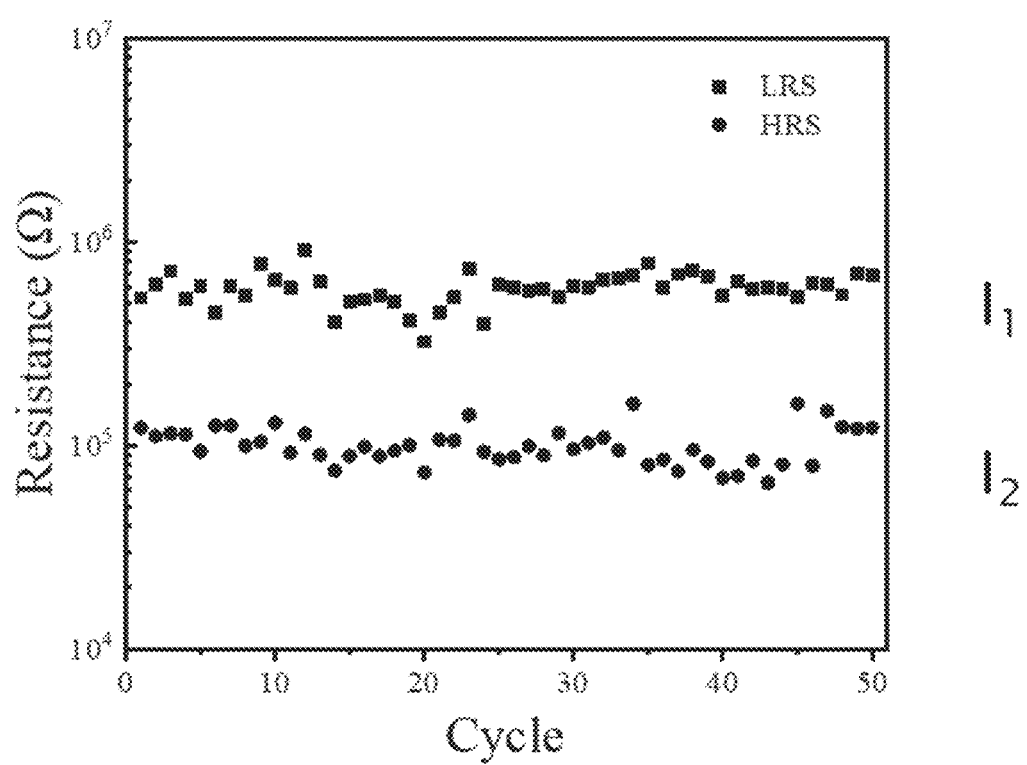
FIG. 6 is a calculation and read result of a 1-bit Hamming distance provided by embodiments of the present disclosure.

When reading the result of the Hamming distance, the source line is at a high voltage level and the bit line is at a low voltage level. When the read voltage is applied, the voltage drop is generated between the bit line and the source line. The resistance state stored in the RRAM may be read according to a read current flowing through the RRAM. As shown in FIG. 6, I1 and I2 correspond to read currents of a single RRAM in the low resistance state and the high resistance state, respectively, without an overlap in a distribution between the two. Therefore, I1 and I2 may be read and distinguished by a peripheral amplifier circuit, so as to implement a reading of an operation result of the Hamming distance stored in the RRAM.

Figure 7A:
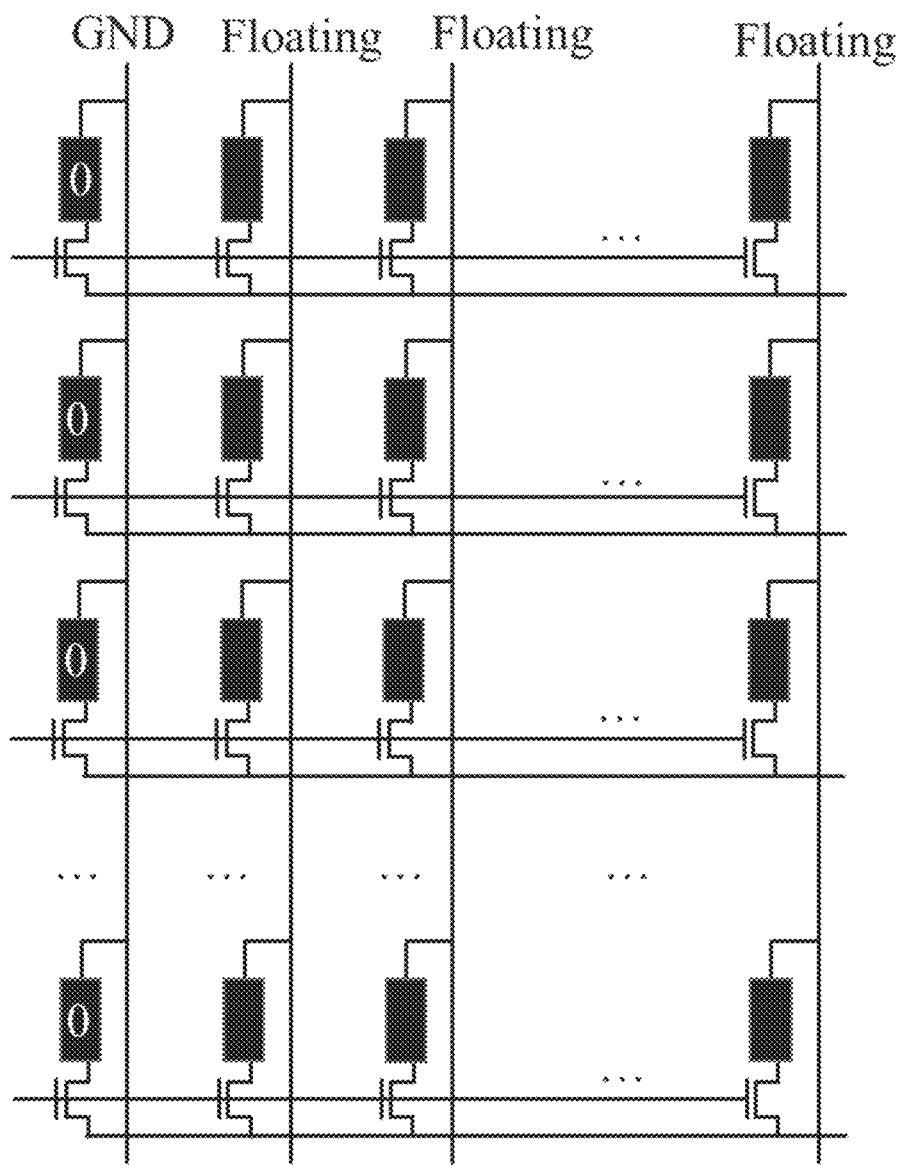
FIGS. 7A to 7D are operations of calculating an N-bit Hamming distance in a 1T1R array structure provided by embodiments of the present disclosure.
Figure 7B:
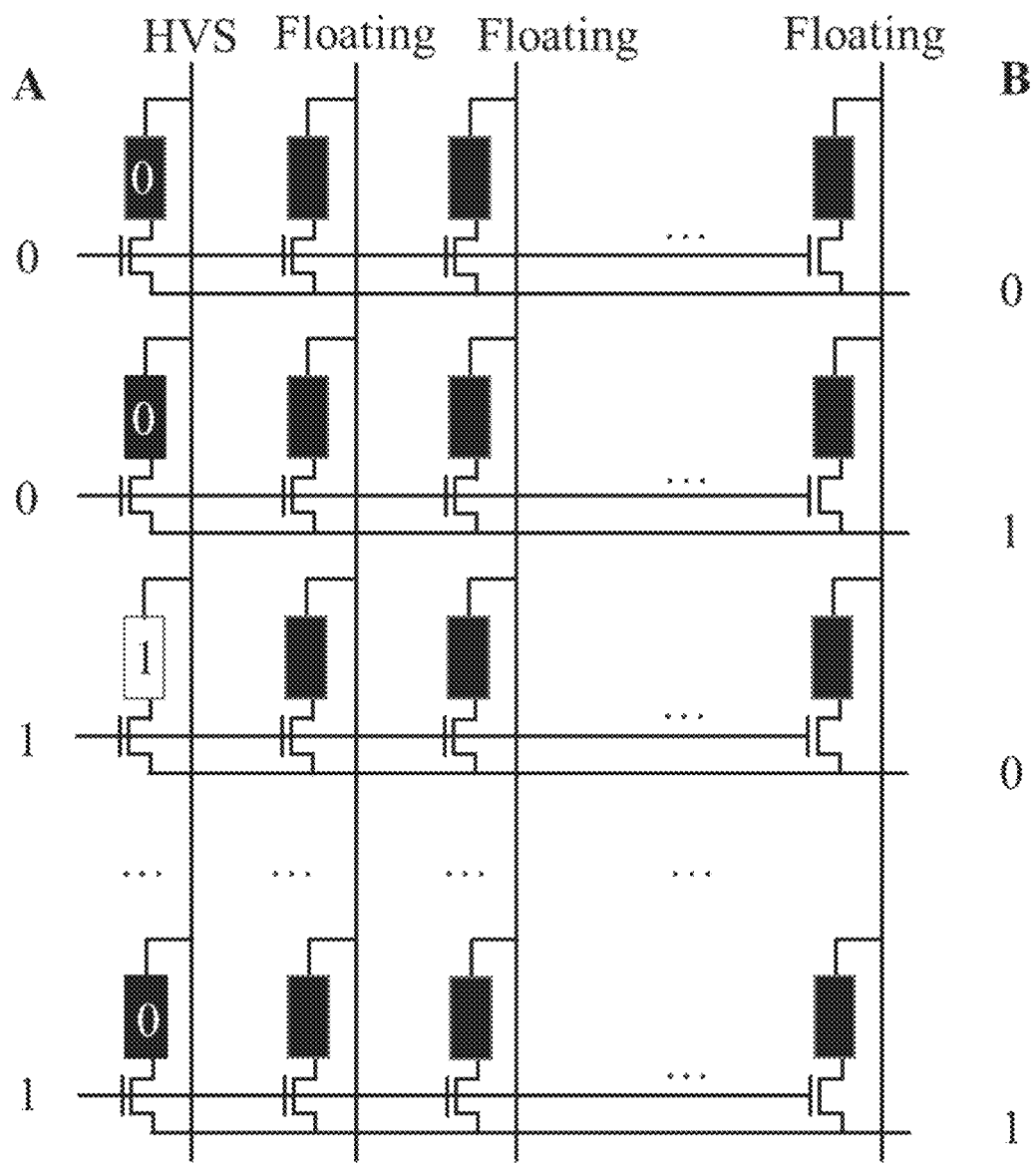

FIGS. 7A to 7D shows a method of calculating an N-bit Hamming distance by expanding a device into a two-dimensional array structure. Firstly, as shown in FIG. 7A, an initialization is required before writing and calculating the memory cell, steps of which are the same as those of the above-mentioned initialization method, and N RRAMs in a same column may perform the initialization in parallel. In a subsequent operation of the solution, a high voltage level is applied to a bit line of a column in which a required computing cell is located, while bit lines of other columns in the array are floating. The character string A, as a word line signal, is written and calculated by controlling a gate voltage of the transistor, while the character string B is used as a voltage signal of the source line, as shown in FIG. 7B. When the character is "0," it is at the low voltage level, and when the character is "1," it is at the high voltage level. In the operation, each single 1T1R structure follows an operation method and a programming rule of calculating a 1-bit information Hamming distance in FIGS. 5A and 5B, so as to implement a logic operation of "A NIMP B", that is, for a character string A=001 . . . 1 and a character string B=010 . . . 1 with a same length, after the NIMP operation, the state stored in the RRAM is "001 . . . 1."

Figure 7C:
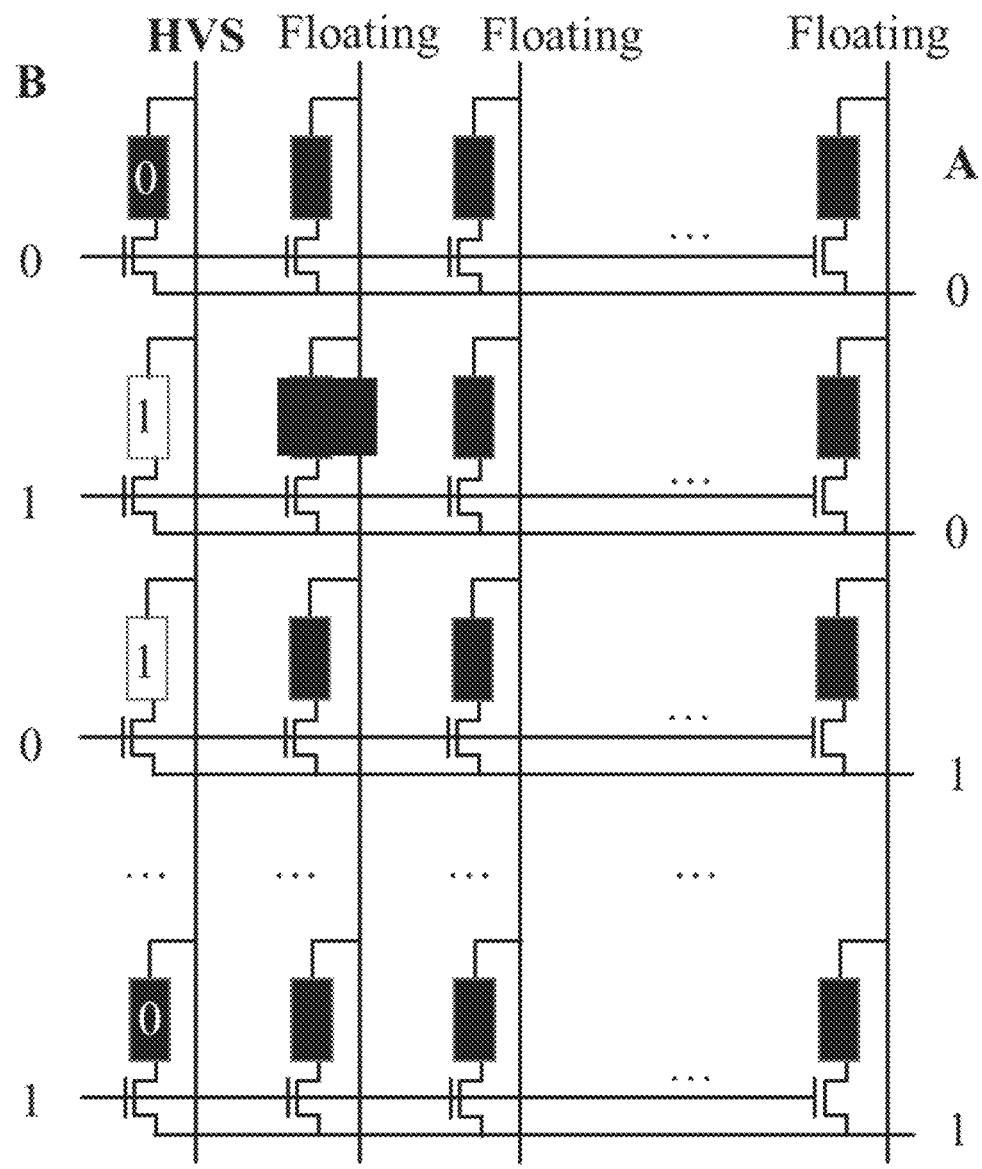
Figure 7D:
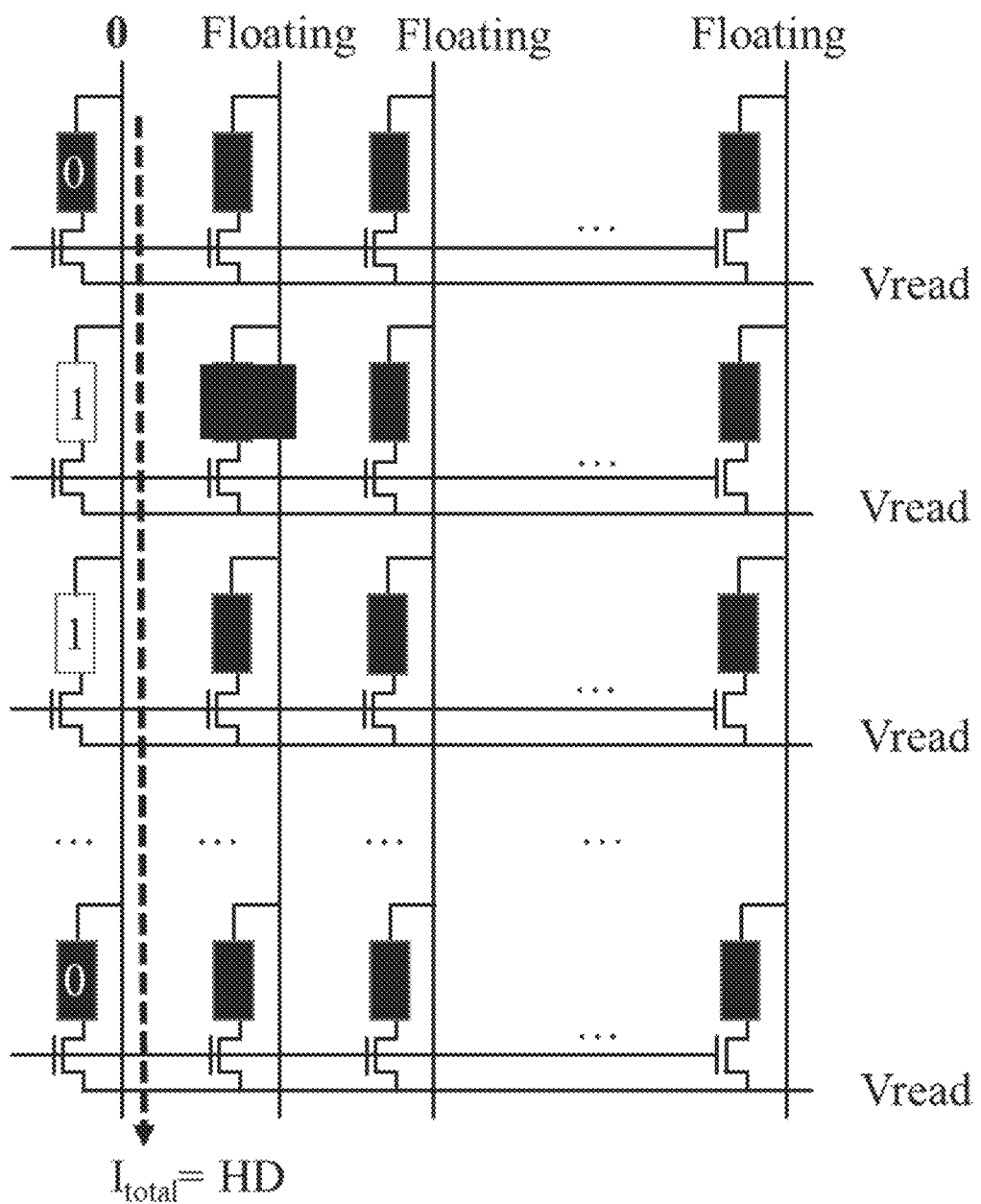

In a second calculation cycle, B is used as a gate control voltage and A is used as a source line voltage, and the information is written into the above-mentioned RRAM array, as shown in FIG. 7C. At this time, a switching rule is the same as the operation in FIGS. 5A and 5B, and the operation of "B NIMP A" is performed in the RRAM. Except that a memory cell with "Bi=1 and Ai=0" is programmed to the low resistance state of "1" other resistance states keep results in a first calculation cycle unchanged. After the second calculation cycle, an information stored in the RRAM is "011 . . . 0." Therefore, after the second calculation cycle, the RRAM array may implement N-Bit character strings A and B, which corresponds to an XOR operation of characters. The number of stored "1" is the Hamming distance of two character strings. A calculation result of adjacent Hamming distances is a difference between currents corresponding to the high and low resistance states of a single device cell (low resistance current-high resistance current) (to 50 uA). The number of bits of N is determined by a switching ratio of the device.

During reading, the source line of the column in which the calculation is performed is at the low voltage level and the bit line is at the high voltage level, and the transistor is turned on. At this time, when the read voltage is applied to the source line, the voltage drop is generated between the read bit line and the source line. According to a total current flowing through RRAM (as shown by an arrow in FIG. 7D), the number of low resistance states stored in the RRAM may be reflected, so as to obtain the Hamming distance.

In the solution, a column of the RRAM array is used for calculation, while the rest of the array is floating without an additional operation. Compared with the method of operating by using a cell in which diagonal is located in the related art, an utilization rate of the array may be improved while writing the character strings in parallel.

In addition, the above-mentioned definitions for various elements and methods are not limited to various specific structures, shapes or methods mentioned in the embodiments, and may be simply changed or replaced by those skilled in the art, for example:
(1) A shape of the memory cell may also be simply replaced with shapes such as a cuboid, an annular shape, etc.
(2) Numerical values reflected in the present disclosure may be different due to different processes.

To sum up, compared with a traditional design method, the memristor and the method of calculating a Hamming distance in the present disclosure have at least one or part of the following advantages compared with the related art:
(1) The memristor provided by the present disclosure may implement a resistance state inversion by using a pulse voltage of 20 ns, and has a nanosecond writing speed. Therefore, the memristor may be used to implement an in-memory computing array with a high speed and low writing delay based on a unique circuit design, and has an ultra-low energy consumption (to 0.224 pJ).
(2) A current compliance layer is added to the memristor device provided by the present disclosure, which is used to stabilize the state after set, reduce a fluctuation of high and low resistance states, and increase a reliability of the Hamming distance calculation.
(3) A memristor array provided by the present disclosure may implement the Hamming distance calculation and a result storage of character strings within three operation cycles by a voltage control.
(4) The present disclosure describes a structure of the memristor array and an operation method of a read-write operation and in-memory computing reconfigurable logic. The memristor array has a simple structure, and has a material system that is compatible with a CMOS process, which is beneficial to a large-scale preparation and integration.
(5) The present disclosure may improve the method of calculating a Hamming distance by using an array diagonal device in previous work, and improve a flexibility of a memristor in-memory computing array. Compared with a traditional computing architecture and other memristor solutions, the present disclosure may implement a high-speed calculation and result storage of the Hamming distance with a less area overhead.

The above-mentioned specific embodiments have described in detail the objectives, technical solutions and advantages of the present disclosure. It should be noted that the above are only specific embodiments of the present disclosure and are not intended to limit the present disclosure. Any modifications, equivalent substitutions, improvements, and the like made within the spirit and scope of the present disclosure shall be included in the scope of protection of the present disclosure.

What is claimed is:

1. A memristor, comprising a transistor and a resistive random access memory, wherein a drain electrode of the transistor is connected to a bottom electrode of the resistive random access memory; and the resistive random access memory comprises: the bottom electrode, a resistive random access material layer, a current compliance layer and a top electrode from bottom to top, wherein the current compliance layer is configured to stabilize a fluctuation of a low resistance by reducing a surge current and optimizing a heat distribution, so as to improve a calculation accuracy of a Hamming distance, wherein the memristor further comprises:
a word line, a bit line and a source line; wherein the word line is connected to a gate electrode of the transistor to control a turn-on and a turn-off of the transistor, and the bit line and the source line are respectively connected to the top electrode of the resistive random access memory and a source electrode of the transistor, so as to control a writing, an operation and a reading of a memory cell, wherein the transistor is turned on, a current pulse is injected from the bottom electrode in response to the bit line being grounded and a source voltage being greater than a threshold voltage of an erase current, so as to implement a switching of the resistive random access memory from a low resistance to a high resistance; otherwise, a current pulse is injected from the top electrode in response to the source line being grounded and a bit line voltage meeting a threshold voltage of a programming current, so as to implement a switching of the resistive random access memory from the high resistance to the low resistance.

2. The memristor according to claim 1, wherein each of the top electrode and the bottom electrode is made of one or any alloy of TiN, Ti, Pt, Ag, Au, Pd, Ru and W, and the resistive random access material layer is made of one of $HfO_x$, $TaO_x$, $TiO_x$, $ZrO_2$, $Al_2O_3$, NiO, ZnO and $Ta_2O_5$; and the current compliance layer is made of one of $SiO_x$, $Al_2O_3$, $TiO_x$, $TaO_x$ and $Ta_2O_5$.

3. The memristor according to claim 1, wherein the transistor is turned on by applying a gate voltage and an initialization forming voltage is applied to the top electrode, so as to set the resistive random access memory in a programmable/erasable state.

4. A method of calculating the Hamming distance using the memristor according to claim 1, comprising:
initializing the memristor among a plurality of memristors into a high resistance state by an erase operation, wherein the plurality of memristors are arranged in a memory array;
encoding a first binary character string by using a word line and encoding a second binary character string by using a source line; and
encoding the first binary character string by using the source line and encoding the second binary character string by using the word line.

5. The method of calculating the Hamming distance according to claim 4, wherein in the step of encoding a first binary character string by using the word line and encoding a second binary character string by using the source line, an information "0" represents grounding, and an information "1" represents a high-level pulse; the transistor is turned on, and the bit line is at a high voltage level, and only a signal of the first binary character string equals 1 and the second binary character string equals 0 is configured to change a resistance state of the resistive random access memory, so as to implement a "not implication" Boolean logic operation on a corresponding bit between the first binary character string and the second binary character string that have a same length.

6. The method of calculating the Hamming distance according to claim 4, wherein in the step of encoding the first binary character string by using the source line and encoding the second binary character string by using the word line, an information "0" represents grounding, and an information "1" represents a high-level pulse; the transistor is turned on, and the bit line is at a high voltage level, and only a signal of the first binary character string=0 and the second binary character string=1 is configured to change a resistance state of the resistive random access memory, so as to implement a "not implication" Boolean logic operation on a corresponding bit between the second binary character string and the first binary character string that have a same length, so that an operation of the Hamming distance between the first binary character string and the second binary character string is implemented.

7. The method of calculating the Hamming distance according to claim 4, a Hamming distance calculating operation is performed on N-bit character string by using a memory cell of a column in the memory array; wherein a size of N depends on a switching ratio of a device and a fluctuation of a resistance value of the device.

8. An in-memory computing integration application of the method of calculating the Hamming distance according to claim 4, further comprising turning on a transistor to read, and comprising that:
a read voltage of 0.2V is provided between the source line and a read bit line during reading, and the read bit line controls the transistor to be turned on, so as to generate a read current; and the Hamming distance is read from a total current according to Kirchhoff's law.

* * * * *